(12) United States Patent
Kordik et al.

(10) Patent No.: US 10,598,681 B2
(45) Date of Patent: Mar. 24, 2020

(54) WHEEL SPEED SENSOR

(71) Applicant: GOODRICH CORPORATION, Charlotte, NC (US)

(72) Inventors: Michael Kordik, Dayton, OH (US); Marc Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 95 days.

(21) Appl. No.: 15/593,687

(22) Filed: May 12, 2017

(65) Prior Publication Data
US 2018/0328955 A1 Nov. 15, 2018

(51) Int. Cl.
G01P 3/488 (2006.01)
G01D 5/20 (2006.01)
B60B 27/00 (2006.01)
B60T 8/171 (2006.01)
G01P 1/04 (2006.01)
B60T 8/17 (2006.01)

(52) U.S. Cl.
CPC .......... G01P 3/488 (2013.01); B60B 27/0068 (2013.01); B60T 8/171 (2013.01); G01D 5/2013 (2013.01); G01P 1/04 (2013.01); B60T 8/1703 (2013.01)

(58) Field of Classification Search
CPC .......... G01P 3/48; G01P 3/488; B60T 8/1703; B64C 25/36; B64C 25/405; B64C 25/44; H02K 21/028; H02K 21/029; H02K 21/026; H02K 21/24
See application file for complete search history.

(56) References Cited

U.S. PATENT DOCUMENTS

| 1,999,347 | A |   | 4/1935  | Urfer |
| 3,743,913 | A |   | 7/1973  | Rebucci |
| 5,019,774 | A | * | 5/1991  | Rosenberg ............... G01P 3/48 244/111 |
| 5,139,461 | A |   | 8/1992  | Kuti |
| 5,281,911 | A |   | 1/1994  | Caron et al. |
| 5,895,991 | A | * | 4/1999  | Butz ......................... B62J 6/10 310/67 A |
| 7,578,185 | B2 |  | 8/2009  | Ether et al. |
| 9,482,686 | B2 |  | 11/2016 | Warner |

(Continued)

FOREIGN PATENT DOCUMENTS

| DE | 3613982  | 10/1987 |
| JP | H10210709 | 8/1998 |

OTHER PUBLICATIONS

European Patent Office, European Search Report dated Oct. 25, 2018 in Application No. 18172024.4-1022.

Primary Examiner — Douglas X Rodriguez
Assistant Examiner — Brent J Andrews
(74) Attorney, Agent, or Firm — Snell & Wilmer, L.L.P.

(57) ABSTRACT

A wheel speed sensor may comprise a magnet; an induction coil coupled to the magnet; a rotor comprising a plurality of teeth, wherein the magnet is disposed proximate the plurality of teeth; a gear system coupled to the rotor comprising an initial gear, wherein the initial gear may be configured to be coupled to a wheel and configured to rotate at a speed equal to a wheel rotational speed of the wheel. The gear system may be configured to cause a rotor rotational speed of the rotor to be greater than the wheel rotational speed in response to the wheel rotating.

20 Claims, 3 Drawing Sheets

(56) References Cited

U.S. PATENT DOCUMENTS

| | | | |
|---|---|---|---|
| 2006/0152104 A1* | 7/2006 | Hino | H02K 21/028 310/268 |
| 2014/0266156 A1* | 9/2014 | Warner | G01P 3/465 324/163 |
| 2016/0178033 A1* | 6/2016 | Chung | F16H 3/62 475/269 |
| 2017/0050627 A1* | 2/2017 | Lee | B60T 8/17558 |
| 2018/0252279 A1* | 9/2018 | Atmur | F16D 63/004 |

* cited by examiner

WHEEL SPEED SENSOR

FIELD

The present disclosure relates to wheel speed sensors, and more specifically, to detecting wheel speeds in aircraft.

BACKGROUND

Modern aircraft and other vehicles are typically equipped with a wheel speed sensor to detect the rotational speed of a wheel in order to determine antiskid activity and/or the overall speed of the vehicle. To detect the rotational wheel speed, the wheel speed sensor may produce a sine wave in response to rotation of the wheel, which may be used to calculate the rotational wheel speed and/or vehicle speed. However, at speeds below a threshold speed, the sine wave produced by the wheel speed sensor may be too weak to accurately read and calculate rotational wheel speed.

SUMMARY

Systems and methods relating to a wheel speed sensor are disclosed. In various embodiments, a wheel speed sensor system may comprise a magnet; an induction coil coupled to the magnet; a rotor comprising a plurality of teeth, wherein the magnet is disposed proximate the plurality of teeth; a gear system coupled to the rotor comprising an initial gear, wherein the initial gear may be configured to be coupled to a wheel and configured to rotate at a speed equal to a wheel rotational speed of the wheel. The gear system may be configured to cause a rotor rotational speed of the rotor to be greater than the wheel rotational speed in response to the wheel rotating. In various embodiments, the magnet may comprise a magnetic pole, and the magnetic pole is spaced from the plurality of teeth such that the magnetic pole is proximate the plurality of teeth creating an air gap defined between the plurality of teeth and the magnetic pole.

In various embodiments, the initial gear may comprise a coupling blade, and the initial gear may be configured to be coupled to the wheel by the coupling blade. In various embodiments, the initial gear may be configured to be coupled to a hub cap coupled to the wheel. In various embodiments, the rotor may comprise iron. In various embodiments, the rotor may be configured to rotate, and at least one of the magnet or the induction coil may be configured to remain stationary, wherein the rotation of the rotor changes the air gap between the plurality of teeth and the magnetic pole. In various embodiments, the rotation of the rotor may be configured to cause a magnetic field around the magnet to flux in response to the changing air gap, and wherein the wheel speed sensor may be configured to produce a sine wave in response. In various embodiments, the gear system may comprise a gear ratio of at least 2 to 1.

In various embodiments, a vehicle may comprise an axle; a wheel coupled to the axle; and a wheel speed sensor coupled to the axle. The wheel speed sensor may comprise an initial gear of a gear system coupled to the wheel such that rotation of the wheel is configured to rotate the initial gear; a rotor, comprising a plurality of teeth, coupled to the gear system, wherein the rotor may be configured to rotate in response to rotation by the gear system, and wherein the gear system may be configured to cause a rotor rotational speed of the rotor to be greater than a wheel rotational speed of the wheel in response to the wheel rotating; a magnet disposed proximate the plurality of teeth wheel; and an induction coil coupled to the magnet.

In various embodiments, the vehicle may further comprise a hubcap coupled to the wheel, wherein the initial gear is coupled to the hubcap. In various embodiments, the initial gear may comprise a coupling blade by which the initial gear is coupled to the hubcap. In various embodiments, the wheel speed sensor may further comprise a housing in which at least one of the magnet, the induction coil, the rotor, and the gear system is enclosed. In various embodiments, the magnet may comprise a magnetic pole, and the magnetic pole is spaced from the plurality of teeth such that the magnetic pole is proximate the plurality of teeth creating an air gap defined between the plurality of teeth and the magnetic pole. In various embodiments, the rotor may be configured to rotate, and at least one of the magnet or the induction coil may be configured to remain stationary, wherein the rotation of the rotor changes the air gap between the plurality of teeth and the magnetic pole. In various embodiments, the rotation of the rotor may be configured to cause a magnetic field around the magnet to flux in response to the changing air gap, and wherein the wheel speed sensor may be configured to produce a sine wave in response. In various embodiments, the gear system may comprise a gear ratio of at least 2 to 1.

In various embodiments, a method of detecting a rotational speed of a wheel may comprise rotating the wheel; rotating an initial gear of a gear system of a wheel speed sensor coupled to the wheel; rotating a rotor coupled to the gear system, wherein the gear system may comprise a gear ratio such that a rotor rotational speed of the rotor is greater than the rotational speed of the wheel; and producing a sine wave via the wheel speed sensor, wherein the wheel speed sensor may comprise a magnet disposed proximate a plurality teeth of the rotor such that an air gap is disposed between the plurality of teeth and the magnet.

In various embodiments, the method may further comprise calculating the rotor rotational speed in response to the producing the sine wave. In various embodiments, the method may further comprise calculating the rotational speed of the wheel in response to calculating the rotor rotational speed. In various embodiments, the rotor rotational speed during the rotating the rotor may be at least twice as fast as the rotational speed of the wheel because the gear system comprises a gear ratio of at least 2 to 1.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Figure 1:
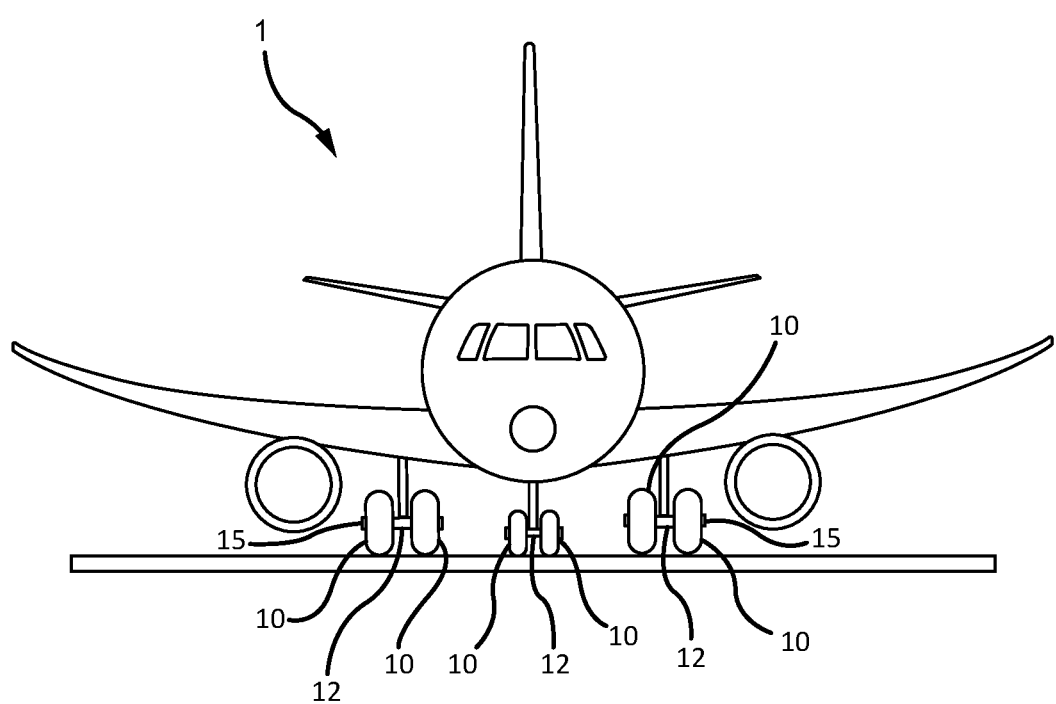
FIG. 1 illustrates an exemplary aircraft, in accordance with various embodiments.

In various embodiments, and with reference to FIG. 1, an exemplary aircraft 1 is depicted. Aircraft 1 may include landing gear comprising wheels 10. Each wheel 10 may be coupled to an axle 12. During aircraft ground travel, such as takeoff, landing, taxiing, or the like, the rotational speed (rotations per minute (rpm)) of wheels 10 may need to be measured to determine antiskid activity and/or the speed of the aircraft, and whether further braking or acceleration should take place. Each wheel 10 may have a hubcap 15 coupled to it, and hubcap 15 may spin at the same, or a proportional, rotational speed as the wheel 10 to which the hubcap 15 is coupled.

Figure 2:
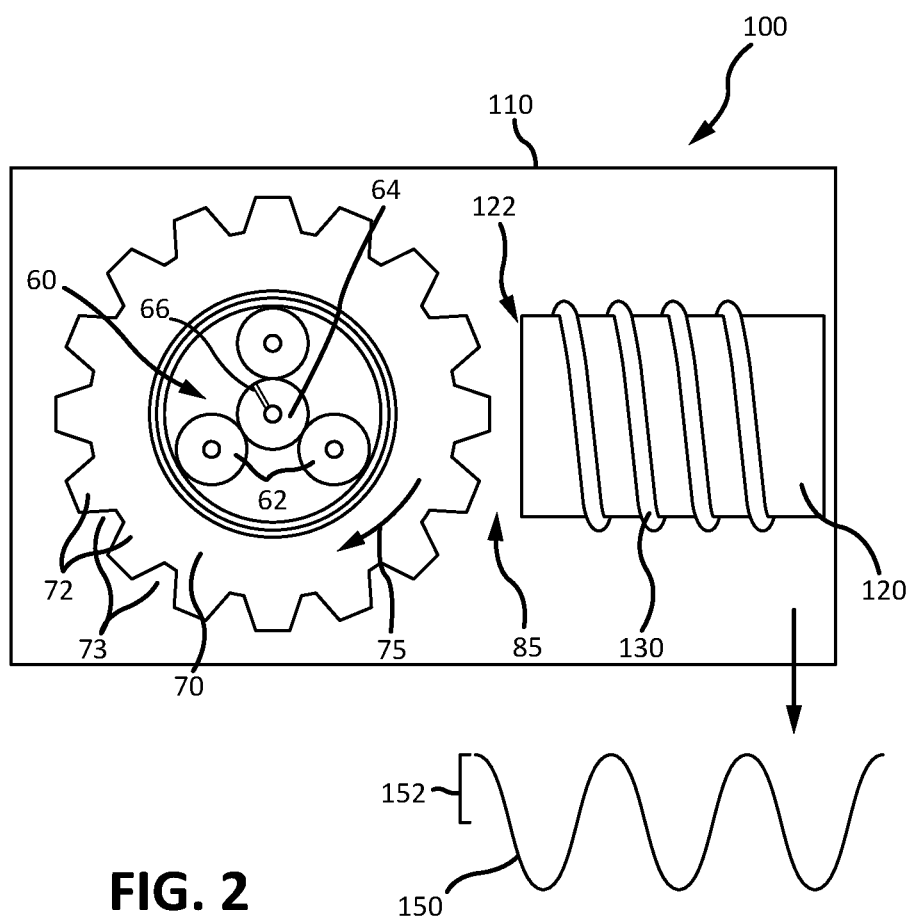
FIG. 2 illustrates a schematic view of a wheel speed sensor, in accordance with various embodiments.

In various embodiments, with combined reference to FIGS. 1 and 2, aircraft 1 may comprise a wheel speed sensor 100 to detect the rotational speed of a wheel 10. It should be understood that wheel speed sensor 100 may be comprised in any vehicle comprising a wheel and an axle. Each wheel 10 may have a wheel speed sensor 100 coupled to it, or in various embodiments, there may be multiple wheel speed sensors 100 coupled to a wheel 10 or multiple wheels 10 coupled to a single wheel speed sensor 100. Wheel speed sensor 100 may be configured to produce a sine wave having a frequency and amplitude based on the rotational speed of rotor 70, from which, the rotational wheel speed of the wheel 10 may be calculated.

In various embodiments, a wheel speed sensor 100 may comprise a rotor 70 having a plurality of teeth 72 with gaps 73 between teeth 72. Rotor 70 may comprise iron, or any other suitable material. In various embodiments, the plurality of teeth 72 may be disposed on a radially outward surface of rotor 70. Rotor 70 may be coupled to a gear system 60 comprising at least one gear 62. Gear system 60 may comprise an initial gear 64, which may be coupled to a wheel 10 and/or a hubcap 15 of the wheel 10. Initial gear 64 may be coupled to wheel 10 and/or hubcap 15 by a coupling blade 66 protruding from initial gear 64. Therefore, initial gear 64 may rotate at the same rotational speed as the wheel 10. Gear system 60 may comprise gears 62 (including initial gear 64) arranged in any suitable configuration, such as a planetary configuration of gear system 60, as depicted in FIG. 2. In response to wheel 10 and/or hubcap 15 rotating (e.g., during ground movement of aircraft 1), initial gear 64 may rotate, causing gears 62 in gear system 60 to rotate, which, in turn, causes rotation of rotor 70. Gear system 60 may comprise a configuration of gears 62 (including initial gear 64) such that rotor 70 rotates (in direction 75, for example) at a greater rotational speed than wheel 10, hubcap 15, and/or initial gear 64. Therefore, gear system 60 may have a gear ratio above 1 to 1, such as 2 to 1, or 3 to 1.

In various embodiments, wheel speed sensor 100 may comprise a magnet 120 and an induction coil 130 disposed around and/or coupled to magnet 120. Magnet 120 and induction coil 130 may be part of a stator, which may remain stationary during rotation of rotor 70. Magnet 120 may comprise iron, or any other suitable material. Magnet 120 may comprise a magnetic pole 122 spaced from, and disposed proximate to, teeth 72 of rotor 70, such that an air gap 85 is formed between, and defined by, teeth 72 and magnetic pole 122. In various embodiments, any component of wheel speed sensor 100 (rotor 70, gear system 60, magnet 120, and/or induction coil 130) may be comprised, completely or partially, in a sensor housing 110. Furthermore, any component of wheel speed sensor 100 (rotor 70, gear system 60, magnet 120, and/or induction coil 130) may be coupled to, or comprised in, completely or partially, axle 12.

In operation, in response to wheel 10 and/or hubcap 15 rotating, initial gear 64 rotates, causing any other gears 62 in gear system 60 to rotate. In response to gears 62 rotating, rotor 70 may rotate. In various embodiments, magnet 120 and/or induction coil 130 may be coupled to gear system 60 such that rotation of gears 62 in gear system 60 rotates magnet 120 and/or induction coil about rotor, which remains stationary. Rotation of rotor 70 (or rotation of magnet 120 about a stationary rotor, in various embodiments) causes the area of air gap 85 between teeth 72 and magnetic pole 122 to fluctuate as teeth 72 and gaps 73 pass magnetic pole 122 (or vice versa). The fluctuation of air gap 85 may cause the magnetic field of magnet 120 to flux (e.g., expand and contract). The magnetic field flux causes current flow in induction coil 130. The direction and magnitude of the current flow within induction coil 130 depends on the rotational speed of rotor 70. Such current characteristics are detected and reflected in a sine wave 150 produced by wheel speed sensor 100. Sine wave 150 may comprise an amplitude 152 (the peak of deviation from zero) and a frequency (the number of complete cycles of sine wave 150 per unit time, e.g., seconds).

From the sine wave 150 produced by the operation of wheel speed sensor 100, the rotational speed of rotor 70 may be calculated using the equation: $S = f/n \times 60$, where S is the rotational speed in rotations per minute (rpm), f is the frequency in Hertz, and n is number of teeth on rotor 70. The rotational speed of rotor 70 may then be used to calculate the rotational wheel speed of wheel 10 based on the gear ratio of gear system 60. For example, if the rotational wheel speed of rotor 70 is calculated to be 1000 rpm, and the gear ratio of gear system 60 is 2 to 1, then the rotational wheel speed of wheel 10 may be 500 rpm. Subsequently, rotational wheel speed of wheel 10 may be used to calculate antiskid activity and/or the speed of aircraft 1.

In various embodiments, in which a wheel speed sensor does not comprise gear system 60, such that the rotor (such as rotor 70) rotates at the same rotations speed as the wheel 10 or the aircraft 1, at aircraft speeds below a speed threshold (e.g., 10 knots (18.5 kilometers per hour (km/h); 11.5 miles per hour (mph)), the sine wave produced by the wheel speed sensor may be too weak (i.e., too low a frequency and/or amplitude) to accurately determine rotor rotational speed, aircraft speed, and/or antiskid activity. Therefore, amplifying the rotational speed of rotor 70 by gear system 60 in wheel speed sensor 100 such that the rotational speed of rotor 70 is greater than the rotational wheel speed of wheel 10 and/or hubcap 15, increases the fluctuation of the magnetic field of magnet 120 and the characteristics of the current flow in induction coil 130. Accordingly, the sine wave 150 produced may be stronger (i.e., having a greater frequency and/or amplitude) at lower aircraft speeds, which may decrease the speed threshold. For example, say the speed threshold of a wheel speed sensor without a gear system 60 is 10 knots (18.5 km/h; 11.5 mph). If gear system 60 was added to the same wheel speed sensor (now wheel speed sensor 100), and the gear ratio of gear system 60 is 2 to 1, rotor 70 would spin twice as fast as wheel 10. Therefore, sine wave 150 produced by wheel speed sensor 100 would have the same strength at an aircraft speed of 5 knots (9.3 km/h; 5.8 mph) as the wheel speed sensor without a gear system would at an aircraft speed of 10 knots. Thus, gear system 60 having a gear ratio of 2 to 1 halves the speed threshold, allowing aircraft speed measuring capabilities at lower speeds.

Figure 3:
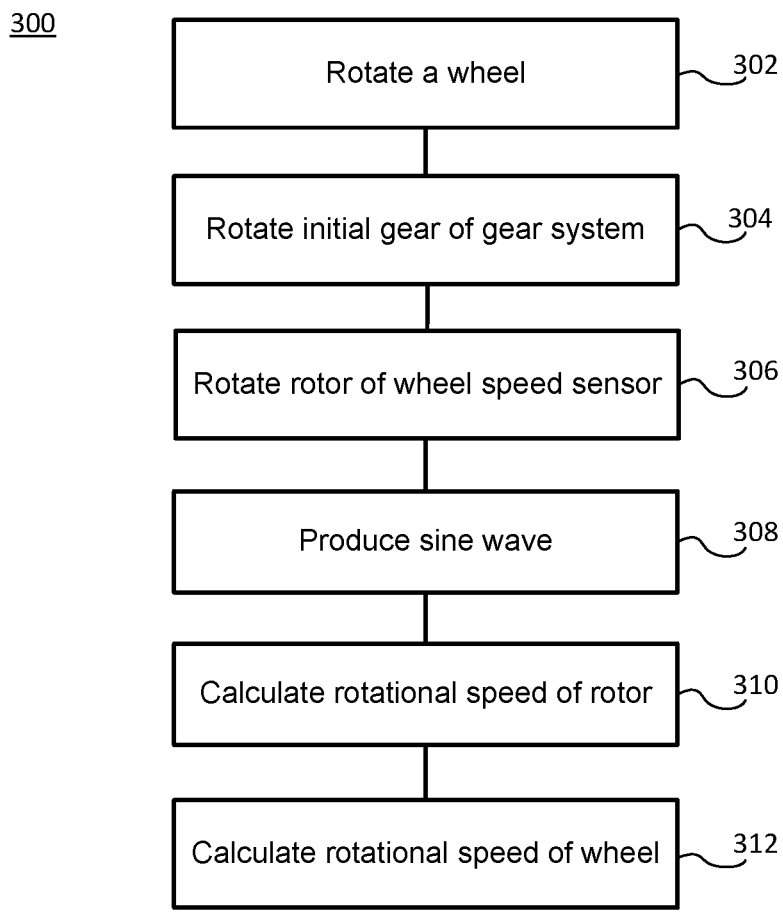
FIG. 3 illustrates a method for sensing and calculating rotational wheel speed, in accordance with various embodiments.

In accordance with various embodiments, FIG. 3 depicts a method 300 for sensing and calculating rotational wheel speed of a wheel. With combined reference to FIGS. 1-3, method 300 may comprise rotating a wheel 10 (step 302), such as during taxiing, takeoff, or landing of aircraft 1. Wheel 10 may comprise hubcap 15 coupled to wheel 10, and initial gear 64 of gear system 60 may be coupled to, and/or in mechanical communication with, wheel 10 and/or hubcap 15. In response to rotating wheel 10 (which may rotate hubcap 15), initial gear 64 of wheel speed sensor 100 may be rotated (step 304). In response, rotor 70 may be rotated (step 306). Gear system 60 may comprise gears 62 coupled to and between initial gear 64 and rotor 70. Therefore, gear system 60 may be configured to cause the rotational speed of rotor 70 to be greater than the rotational speed of initial gear 64.

The rotation of rotor 70 may cause air gap 85 between magnetic pole 122 of magnet 120 and teeth 72 of rotor 70 to fluctuate, causing the magnetic field of magnet 120 to flux (e.g., expand and/or contract). As discussed herein, the flux of the magnetic field causes fluctuations in current flow in induction coil 130, which cause wheel speed sensor 100 to produce a sine wave 150 (step 308) reflective of the fluctuations in air gap 85 and current flow in induction coil 130. Sine wave 150 may comprise an amplitude 152 and a frequency, which may be used to calculate the rotational speed of rotor 70 (step 310), as described herein. The rotational speed of rotor 70 may be used to calculate the rotational speed of wheel 10 (step 312), as described herein, which may be used to calculate antiskid activity and/or the speed of aircraft 1. Steps 308, 310, and/or 312 may be performed by a processor comprised in and/or in electronic communication with wheel speed sensor 100.

As discussed herein, in various embodiments, it should be understood that air gap 85 may fluctuate based on the rotation of magnet 120 and/or induction coil 130 about rotor 70, which may be stationary. In such embodiments, magnet 120 and/or induction coil 130 may be coupled to gear system 60 such that magnet 120 and/or induction coil 130 rotate in response to rotation of wheel 10 and/or gears 62.

In various embodiments, wheel speed sensor 100 may comprise a processor and a tangible, non-transitory memory. The processor may be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. Wheel speed sensor 100 may comprise one or more logic modules to measure the magnetic field caused by the varying air gap 85 during the rotation of rotor 70. In various embodiments, wheel speed sensor 100 may also be in electronic communication with, integrated into, computer systems, such as those onboard an aircraft (e.g., aircraft 1 of FIG. 1) (e.g., a full authority digital engine control (FADEC), an engine-indicating and crew-alerting system (EICAS), a brake control unit (BCU) and/or the like). Such computer systems may receive, and/or display sine wave 150, and calculate a wheel speed and/or an aircraft speed based on the frequency and/or amplitude of sine wave 150.

While this disclosure discusses a wheel speed sensor in the context of an aircraft, it should be understood that the concepts and embodiments discussed herein may be implemented in any vehicle comprising a wheel and an axle (e.g., automobiles).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wheel speed sensor, comprising:
   a magnet;
   an induction coil coupled to the magnet;
   a rotor comprising a plurality of teeth, wherein the magnet is disposed proximate the plurality of teeth;
   a gear system coupled to the rotor comprising an initial gear, wherein the initial gear is configured to be coupled to a wheel and configured to rotate at a speed equal to a wheel rotational speed of the wheel, and wherein the gear system comprises a gear ratio causing an amplification of a rotor rotational speed of the rotor relative to the wheel rotational speed, such that the rotor rotational speed is greater than the wheel rotational speed in response to the wheel rotating,
   wherein the amplification of the rotor rotational speed is configured to decrease a threshold speed below which the wheel rotational speed cannot be accurately measured by increasing fluctuation of a magnetic field between the magnet and the plurality of teeth and producing a sine wave to determine the wheel rotational speed.
2. The wheel speed sensor of claim 1, wherein the magnet comprises a magnetic pole, and the magnetic pole is spaced from the plurality of teeth such that the magnetic pole is proximate the plurality of teeth creating an air gap defined between the plurality of teeth and the magnetic pole.
3. The wheel speed sensor of claim 2, wherein the rotor is configured to rotate, and at least one of the magnet or the induction coil is configured to remain stationary, wherein the rotation of the rotor changes the air gap between the plurality of teeth and the magnetic pole.
4. The wheel speed sensor of claim 1, wherein the initial gear comprises a coupling blade, and the initial gear is configured to be coupled to the wheel by the coupling blade.
5. The wheel speed sensor of claim 4, wherein the initial gear is configured to be coupled to a hub cap coupled to the wheel.
6. The wheel speed sensor of claim 1, wherein the gear system comprises a planetary gear configuration, wherein at least one gear of the gear system is disposed within the rotor.
7. The wheel speed sensor of claim 6, wherein a gear of the gear system is coaxial with the rotor.
8. The wheel speed sensor of claim 1, wherein the gear ratio of the gear system is at least 2 to 1.
9. A vehicle, comprising:
   an axle;
   a wheel coupled to the axle; and
   a wheel speed sensor coupled to the axle comprising:
      an initial gear of a gear system coupled to the wheel such that rotation of the wheel is configured to rotate the initial gear;
      a rotor, comprising a plurality of teeth, coupled to the gear system, wherein the rotor is configured to rotate in response to rotation by the gear system, and wherein the gear system comprises a gear ratio causing an amplification of a rotor rotational speed of the rotor relative to a wheel rotational speed of the wheel, such that the rotor rotational speed is greater than the wheel rotational speed of the wheel in response to the wheel rotating;
      a magnet disposed proximate the plurality of teeth; and
      an induction coil coupled to the magnet,
      wherein the amplification of the rotor rotational speed is configured to decrease a threshold speed below which the wheel rotational speed cannot be accurately measured by increasing fluctuation of a magnetic field between the magnet and the plurality of teeth and producing a sine wave to determine the wheel rotational speed.
10. The vehicle of claim 9, further comprising a hubcap coupled to the wheel, wherein the initial gear is coupled to the hubcap.
11. The vehicle of claim 10, wherein the initial gear comprises a coupling blade by which the initial gear is coupled to the hubcap.
12. The vehicle of claim 9, wherein the wheel speed sensor further comprises a housing in which at least one of the magnet, the induction coil, the rotor, and the gear system is enclosed.
13. The vehicle of claim 9, wherein the magnet comprises a magnetic pole, and the magnetic pole is spaced from the plurality of teeth such that the magnetic pole is proximate the plurality of teeth creating an air gap defined between the plurality of teeth and the magnetic pole.
14. The vehicle of claim 13, wherein the rotor is configured to rotate, and at least one of the magnet or the induction coil is configured to remain stationary, wherein the rotation of the rotor changes the air gap between the plurality of teeth and the magnetic pole.
15. The vehicle of claim 9, wherein the gear system comprises a planetary gear configuration, wherein at least one gear of the gear system is disposed within the rotor.
16. The vehicle of claim 9, wherein the gear ratio of the gear system is at least 2 to 1.
17. A method of detecting a rotational speed of a wheel, comprising:
   rotating the wheel;
   rotating an initial gear of a gear system of a wheel speed sensor coupled to the wheel; and
   decreasing a threshold speed below which the rotational speed of the wheel cannot be accurately measured by:
      amplifying a rotor rotational speed of a rotor coupled to the gear system relative to the rotational speed of the wheel via a gear ratio of the gear system such that the rotor rotational speed is greater than the rotational speed of the wheel, wherein the rotor comprises a plurality of teeth disposed proximate a magnet of the wheel speed sensor such that an air gap is disposed between the plurality of teeth and the magnet;

causing fluctuation of a magnetic field between the magnet and the plurality of teeth resulting from the amplified rotor rotational speed; and producing a sine wave, via the wheel speed sensor, from the fluctuation of the magnetic field resulting from the amplified rotor rotational speed.

18. The method of claim 17, further comprising calculating the amplified rotor rotational speed in response to the producing the sine wave.

19. The method of claim 18, further comprising calculating the rotational speed of the wheel in response to calculating the amplified rotor rotational speed.

20. The method of claim 18, wherein the amplified rotor rotational speed during the amplifying the rotor rotational speed is at least twice as fast as the rotational speed of the wheel because the gear ratio of the gear system is at least 2 to 1.

* * * * *